Figure 1:
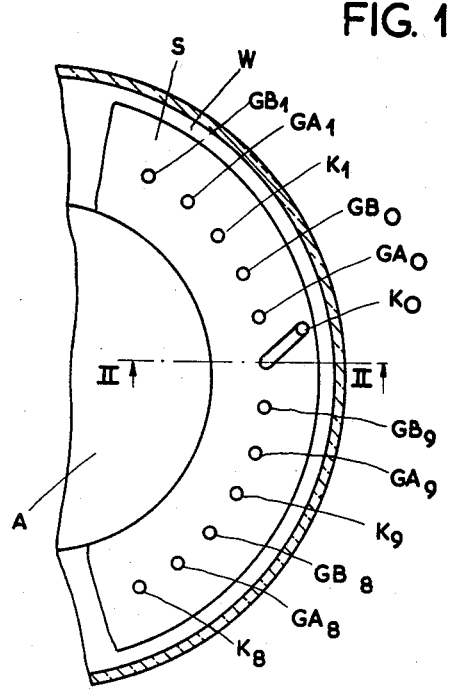

Sept. 22, 1959   G. O. CROWTHER ET AL   2,905,860
COLD-CATHODE STEPPING TUBE AND CIRCUIT THEREFOR
Filed March 24, 1958   6 Sheets-Sheet 1

INVENTORS
GERALD OFFLEY CROWTHER
GRAHAM FRANK JEYNES
BY
Frank R. Trifari
AGENT

INVENTORS
GERALD OFFLEY CROWTHER
GRAHAM FRANK JEYNES
BY
AGENT

Sept. 22, 1959  G. O. CROWTHER ET AL  2,905,860
COLD-CATHODE STEPPING TUBE AND CIRCUIT THEREFOR
Filed March 24, 1958  6 Sheets-Sheet 4
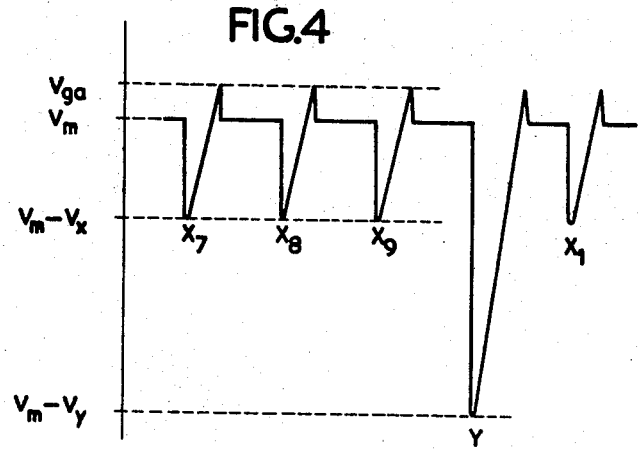
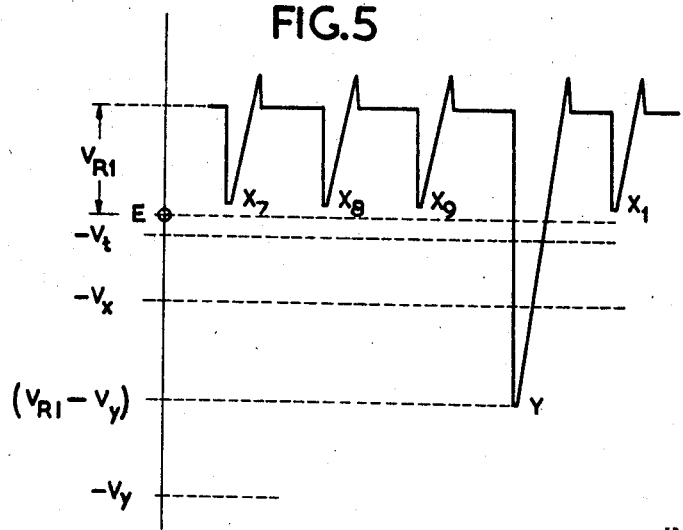
INVENTORS
GERALD OFFLEY CROWTHER
GRAHAM FRANK JEYNES
BY
AGENT

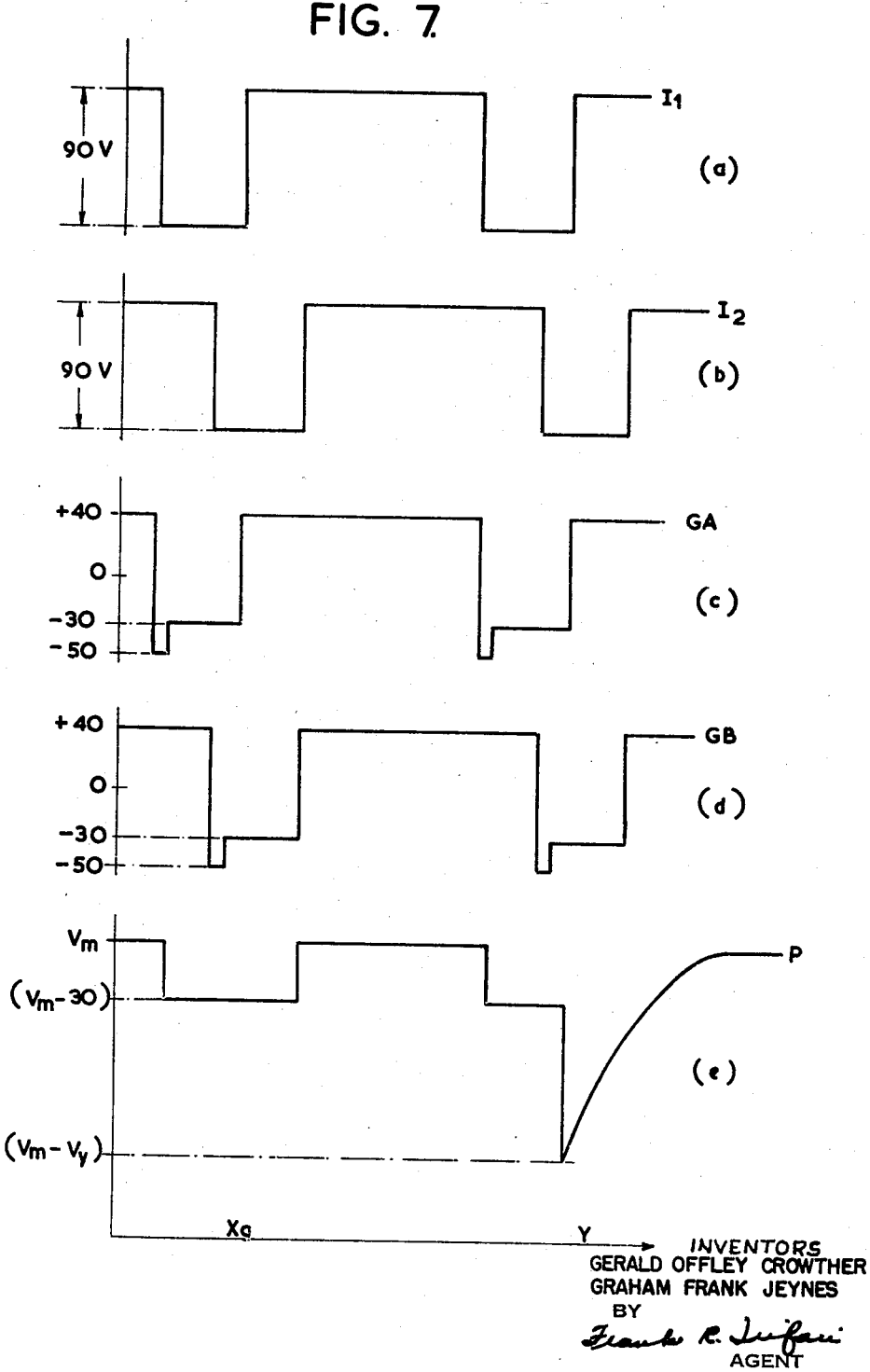

Sept. 22, 1959 G. O. CROWTHER ET AL 2,905,860
COLD-CATHODE STEPPING TUBE AND CIRCUIT THEREFOR
Filed March 24, 1958 6 Sheets-Sheet 6

INVENTORS
GERALD OFFLEY CROWTHER
GRAHAM FRANK JEYNES
BY
AGENT

United States Patent Office 2,905,860
Patented Sept. 22, 1959

2,905,860

COLD-CATHODE STEPPING TUBE AND CIRCUIT THEREFOR

Gerald Offley Crowther, Cheam, and Graham Frank Jeynes, Streatham Vale, England, assignors to North American Philips Company, Inc., New York, N.Y.

Application March 24, 1958, Serial No. 723,404

Claim priority, application Great Britain March 22, 1957

6 Claims. (Cl. 315—84.6)

Improvements relate to glow-discharge counting tubes comprising an anode and a plurality of main cathodes to which the discharge can burn at will, and auxiliary electrodes arranged between the main cathodes, and a circuit arrangement comprising such a tube.

The invention relates to a glow-discharge counting tube comprising an anode and a plurality of wire-shaped main cathodes, to which the discharge can burn at will, and two auxiliary electrodes between each pair of main cathodes. The invention furthermore relates to a circuit arrangement comprising such a glow-discharge tube.

With the known tubes of the aforesaid kind pulses are derived from the cathode indicated by 0 to control a further tube, if counting is to be performed in more than one unit. As a rule, the pulse which can be derived from the known tubes, is too small to drive a further tube directly, i.e. without intermediate amplification by means of a vacuum tube or a gas-filled tube. Moreover, since the pulse is derived from the cathode, it has the wrong polarity; however, when using an intermediate tube, this is inverted.

The invention has for its object to provide a tube which permits of controlling directly a further tube of the same type.

In a glow-discharge counting tube, having a centrally arranged anode and a plurality of wire-shaped main cathodes arranged symmetrically around the anode, and between each pair of main cathodes two wire-shaped auxiliary electrodes, which are connected in two rows in parallel with each other and which produce the transfer of the discharge from one main cathode to the following main cathode, one of the main cathodes is, in accordance with the invention, shifted with respect to the other main cathodes or arranged in some other manner in a different ignition state with respect to the anode, in a manner such that the ignition voltage between the anode and this marker cathode or zero cathode is higher than that between the anode and the other main cathodes.

The voltage pulse which can be derived during the transition of the discharge from an arbitrary cathode to a further cathode of the tube is approximately equal to that at the cathode concerned prior to the ignition is minus that occurring during discharge. Since the anode voltage is linked by the maintaining voltage, which varies only slightly with the relative positions of anode and cathode, to the cathode voltage, a higher ignition voltage means that a higher voltage pulse can be obtained.

As stated above, a different ignition voltage can be obtained not only by shifting in place the marker cathode concerned, but also by covering the cathode for the major part by an insulator or a resistance layer. If desired, a cathode of a material which has a different emissive potential may be employed.

In the circuit arrangement according to the invention the current-limiting resistor for the tube is included in the anode lead, the output lead for the pulses to be transmitted being connected directly to the anode lead. The circuit arrangement in which the tube according to the invention is employed varies to a certain extent with the fact whether the tube is the input tube of the counting circuit or a further tube, which is governed by a preceding tube. In the latter case the two auxiliary electrodes are controlled by only a single pulse, whereas the input tube receives separate pulses for the two series of auxiliary electrodes, which are located between two main cathodes. If the tube is controlled by only one input pulse, the interconnected even-numbered cathodes and the interconnected odd-numbered cathodes are connected separately via a parallel combination of a resistor and a capacitor to a negative voltage relative to the common zero point of the arrangement, whereas the marker cathode is also connected through a parallel combination of a resistor and a capacitor to a negative voltage, which, however, exceeds that to which the other cathodes are connected.

Of the two rows of auxiliary electrodes located between the main cathodes the first row is connected without the interposition of a resistor to the common zero point of the arrangement and the second row is connected via a comparatively high resistance thereto, while the latter row is connected, moreover, via a capacitor to the input terminal to which the negative voltage pulses are applied; the resistors in the cathode leads are chosen to be such that the discharge passing to a main cathode changes over for the major part to the first adjacent auxiliary electrode, while the resistor in the lead to the second row of auxiliary electrodes is chosen to be so high that, when a discharge changes over to a main cathode, the second row of auxiliary electrodes assumes a voltage which approaches that of the anode.

In the circuit arrangement according to the invention in which the glow-discharge counting tube is governed by two input pulses, which are fed in succession to the first and the second row of auxiliary electrodes located between the main cathodes, the current-limiting resistor is also included in the anode conductor and the output conductor for transmitting pulses is connected directly to the anode. The even-numbered and the odd-numbered cathodes are connected directly to the common zero point of the arrangement and the zero cathode or marker cathode is connected via a parallel combination of a resistor and a capacitor to a negative voltage with respect to the common zero point, the lead to this marker cathode including a connection for a rectifier, which is connected to the common zero point in a manner such that the marker cathode can never obtain a positive voltage relative to the common zero point. The two rows of auxiliary electrodes are connected via resistors to a positive bias voltage which is sufficient to pass the discharge to a main cathode after the negative pulses have ceased, which are applied from the input terminal to these auxiliary electrodes, while between the capacitors, via which these pulses are supplied, and the auxiliary electrodes, provision is made of resistors to restrict the negative voltage pulses at the anode, if negative voltage pulses at the auxiliary electrodes cause the discharge to change over thereto.

Figure 2:
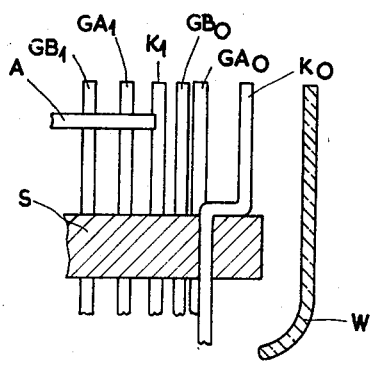
Figure 3:
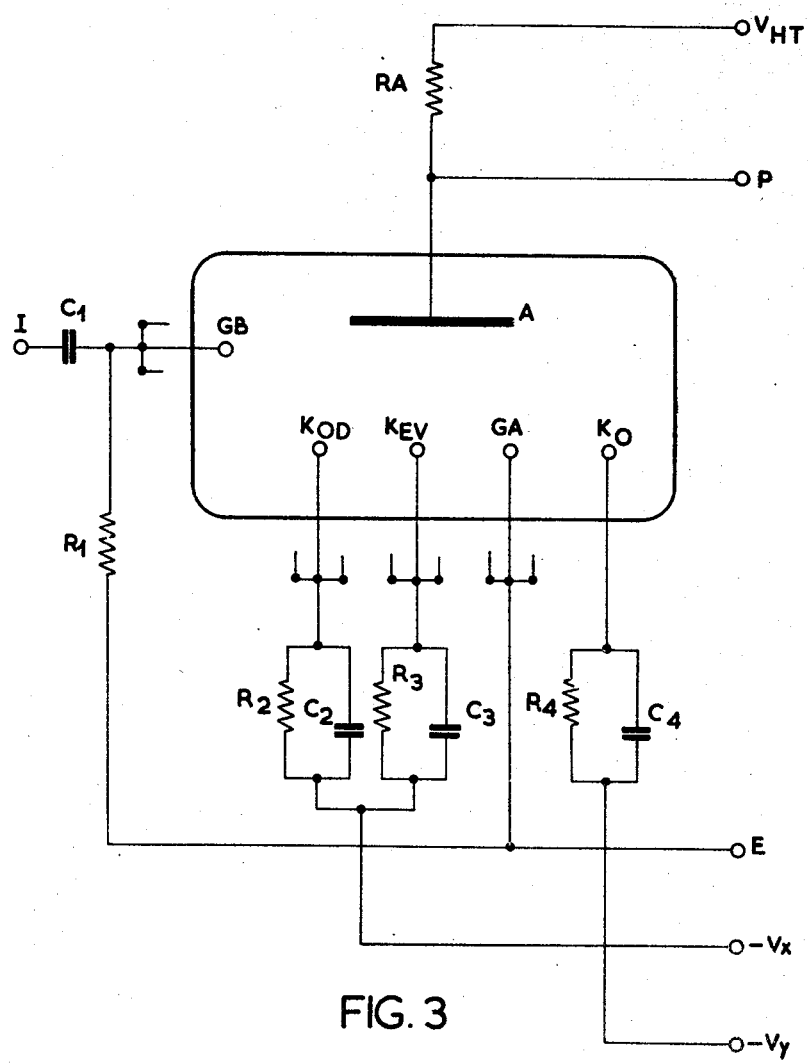
Figure 6:
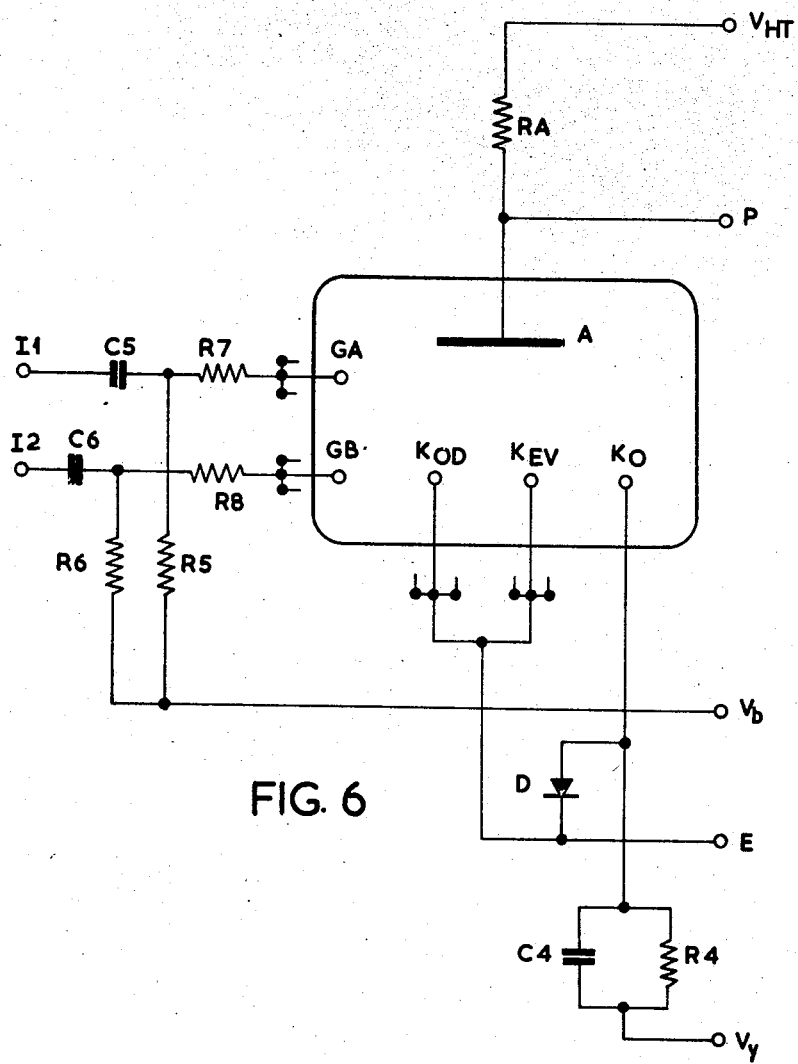
Figure 8:
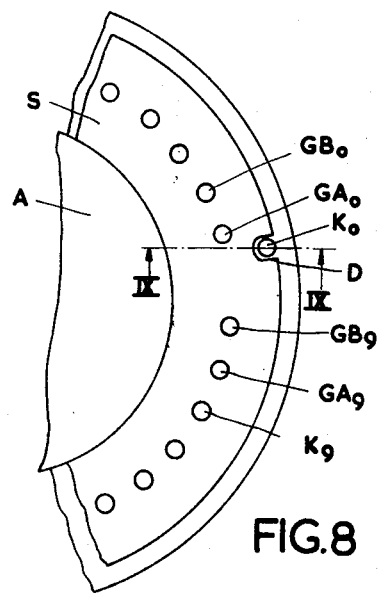
Figure 9:
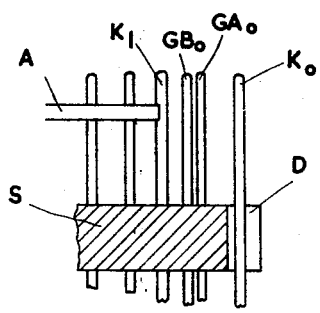

The invention will be described more fully with reference to the accompanying drawing, in which:

Fig. 1 shows a plan view of part of the electrode arrangement according to the invention, and Fig. 2 shows an axial sectionl view of the arrangement shown in Fig. 1, Fig. 3 shows an arrangement comprising a tube according to the invention, Figs. 4 and 5 show voltage variations at the electrodes of the tube shown in Fig. 3, Fig. 6 shows an arrangement comprising a tube according to the invention as shown in Fig. 3, Fig. 7 shows the voltage variation at electrodes of a tube as shown in Fig. 6, Figs. 8 and 9 show variants of the arrangements shown in Figs. 1 and 2, and Figs. 10 and 11 also show variants of the arrangements shown in Figs. 1 and 2.

Referring to Figs. 1 and 2 A designates the anode, which is constituted by a circular metal disc. The main cathodes, which are made of metal wire, are designated by $K_1$, $K_2$, ... $K_9$ and the zero cathode or marker cathode is designated by $K_0$. The auxiliary electrodes are designated by $GA_1$ ... $GA_9$ and by $GB_1$ ... $GB_9$. The marker cathode has auxiliary electrodes $GA_0$ and $GB_0$. The electrodes are, all of them, fixed in a ceramic disc S and, particularly from Fig. 2, it is clearly evident that the marker cathode $K_0$ is located at a larger distance from the anode A, so that between these two electrodes a higher break-down voltage is obtained than between the anode and the other electrodes. The wall of the tube is designated by W.

In Fig. 3 the same references are used as in Figs. 1 and 2. In this figure the anode voltage terminal is designated by $V_{HT}$, the anode resistor by RA and the output terminal by P. The common zero point is designated by E and the negative voltage terminals for the even-numbered and the odd-numbered cathodes by $-V_x$ and for the marker cathode by $-V_y$. The input terminal is designated by I, the input capacitor by $C_1$ and the resistor in the conductor to the second row of auxiliary electrodes by $R_1$. The resistor and the capacitor in the conductor to the odd-numbered cathodes $K_{od}$ are designated by $R_2$ and $C_2$ respectively, those in the lead to the even-numbered cathodes $K_{ev}$ by $R_3$ and $C_3$ respectively and those in the lead to the marker cathode by $R_4$ and $C_4$ respectively. Of all kinds of electrodes only one is shown, but in the connecting lead each time two further connecting conductors are symbolically indicated, these connections branching preferably only inside the tube.

It is evident from Fig. 1 that the cathode $K_0$ is shifted not only outwardly but also in the direction towards the discharge, in order to facilitate a simultaneous burning of the discharge to this marker cathode and to the associated first auxiliary electrode.

This, however, is not necessary and if a tube is to operate in two directions, it is even not permissible.

The circuit arrangement of Fig. 3 operates as follows: If it is assumed that the discharge burns to the cathode $K_8$ and if the resistor $R_3$ has such a value that the current to this cathode is many times lower than that to the associated first auxiliary electrode $GA_8$, the potential of $K_8$ will adjust itself in a manner such that it is equal to that of the common zero point, to which $GA_8$ is connected directly. If a negative pulse is fed to the second auxiliary electrode via the terminal I and the capacitor $C_1$, part of the current will pass over to the electrode $GB_8$, so that the discharge path between anode and cathode $K_9$, where a voltage equal to the ignition voltage of the tube plus the voltage $V_x$ is operative, will ignite. The discharge then changes over completely to the cathode $K_9$, until the voltage thereof has increased to that of the common zero point E, after which the discharge divides itself again between $K_9$ and $GA_9$ in the same manner as this is the case between $K_8$ and $GA_8$.

If a further negative pulse is fed to the input terminal I, the discharge will first change over to the electrode $GB_9$, which initiates the discharge between the anode and the marker cathode $K_0$, between which a voltage difference is operative which is equal to the ignition voltage plus the negative voltage $V_x$. Since the voltage $V_y$ is materially more negative than the voltage $V_x$, the negative pulse occurring at the anode during the change-over of the discharge to the cathode $K_0$ will be materially higher than the pulse occurring during the change-over to one of the further main cathodes. The discharge remains finally stationary at the cathode $K_0$ and the first auxiliary electrode $GA_0$; the resistor $R_4$ must be such that the current passes mainly over to $GA_0$. To this end the resistor $R_4$ must exceed considerably $R_2$ or $R_3$ in order to neutralize the difference between $V_x$ and $V_y$.

Fig. 4 shows the voltage at the anode relative to the common zero point with different transitions of the discharge between the main cathodes. When the discharge changes over to a main cathode, the anode is at the potential $V_m$. At the transition of the discharge to an arbitrary main cathode, which is not the marker cathode, the anode voltage drops to the value $V_m-V_x$, since the non-operative cathode is at a voltage $-V_x$ and the voltage, which prevails at the anode during a burning discharge, cannot exceed that at the cathode by more than $V_m$. Owing to the charging on the capacitor $C_2$ or $C_3$, according as the discharge has changed over to an odd-numbered or an even-numbered cathode, the anode voltage increases to the value $V_{ga}$, at which the first auxiliary electrode GA, which is associated with the operative cathode, takes part in the discharge. The anode voltage then drops immediately to the value $V_m$. Fig. 3 shows first three transitions of the said kind, which are indicated by $X_7$, $X_8$, $X_9$ in accordance with the cathode to which the discharge changes over. However, if the discharge Y changes over to the marker cathode, the anode voltage drops to the value $V_m-V_y$, after which it increases to the value $V_{ga}$ and any further transition may occur. In the arrangement shown in Fig. 3 suitable values of the voltage $V_{HT}$ are 500 v. +, $V_x$ 40 v.— and $V_y$ 120 v.—. The value of the voltage pulses indicated in Fig. 4 by X and Y is therefore: 40 and 120 v. respectively and in practice the latter value suffices to govern a further tube, while the use of a limiting diode is not required.

Owing to the high value of the resistor $R_1$, the second row of auxiliary electrodes GB tends to assume a voltage which approaches that of the anode and this has the advantage that a discharge transmitted to a cathode cannot return to the preceding auxiliary electrode.

The voltage value assumed by the second row of auxiliary electrodes depends upon the discharge current of the tube and the resistance value of $R_1$. The value of this voltage is indicated by $V_{r1}$ with respect to the common zero point E. From Fig. 5, in which the output pulses of one tube are illustrated as they are supplied to a further tube, it is readily evident that the negative pulses designated by X are not sufficient to render the second row of auxiliary electrodes negative relative to the first row of auxiliary electrodes, so that these pulses, which are produced at the transition of the discharge to a cathode which is not the marker cathode, cannot govern the further tube, while the pulses designated by Y can, indeed, govern the further tube.

The control of the second tube requires the voltage at the auxiliary electrodes to drop to the value $-V_t$, so that it is clearly evident from the figure that the pulse designated by Y is largely sufficient.

For completeness sake a few voltage levels $-V_x$, $-V_y$ and $(V_{r1}-V_y)$ are indicated in the figure.

In the arrangement shown in Fig. 6, which is suitable for the first tube in a counting circuit, in which each step is produced by two input pulses, the anode resistor $R_A$ is again included in the anode lead. The even-numbered and the odd-numbered cathodes $K_{od}$ and $K_{ev}$ are connected directly to the common zero point E, whereas the marker cathode $K_0$ is connected via the parallel combination of the resistor $R_4$ and the capacitor $C_4$ to the negative voltage $V_y$. The first auxiliary electrodes GA are connected via a resistor $R_7$ and a capacitor $C_5$ to the input terminal $I_1$. The second auxiliary electrodes GB are connected via the resistor $R_8$ and the capacitor $C_6$ to the input terminal $I_2$. Furthermore, the first and the second auxiliary electrodes are connected via the resistors $R_5$ and $R_6$, which are connected in series with the resistors $R_7$ and $R_8$, to the positive voltage $V_b$.

The function of the resistors $R_7$ and $R_8$ will be explained also with reference to Fig. 7. The positive voltage $V_b$ at the auxiliary electrodes is usually 30 to 50 v., preferably 40 v. The value of the negative voltage pulses at the input terminals $I_1$ and $I_2$ is assumed to be 90 v.

When the discharge burns to one of the main cathodes, which is not the marker cathode, the anode voltage will assume the value $V_m$ relative to the common zero point E. The voltage at each of the auxiliary electrodes GA and GB will be equal to $V_b$ in the absence of input pulses. When an input pulse is applied to the terminal $I_1$, the voltage at the electrode GA will first drop by an amount equal to the value of the pulse, in this case 90 v. The pulses at the first row of auxiliary electrodes GA are indicated in Fig. 7a and the voltage at the first row of auxiliary electrodes is indicated in Fig. 7c. It is evident from Fig. 7c that the voltage at GA will drop to −50 v. until the discharge between the anode and the first auxiliary electrode occurs near the driven main cathode. Consequently, the voltage at the first auxiliary electrode will increase abruptly, since a voltage drop of about 20 v. occurs across the resistor $R_7$. The voltage at the first auxiliary electrode then is − 30 v. While the negative pulse is still operative at the first auxiliary electrode GA an identical negative pulse is applied to the second row of auxiliary electrodes GB, the pulse being illustrated in Fig. 7b and the voltage at the electrodes GB in Fig. 7d. The voltage variation at the electrodes GB corresponds to that at the electrodes GA. At the termination of the pulses at the electrodes GA and GB their voltage increases again to the value of $V_b$ of 40 v., the discharge being then transferred to the next-following main cathode. It will be evident that the value $V_b$ of 40 v. is chosen so high in order to ensure the transfer of the discharge to the next-following main cathode.

The anode voltage is shown in Fig. 7e, from which it is evident that at the first pulse $X_9$, the anode voltage drops to the value $V_n-30$, since the anode voltage can never exceed the voltage at the cathode by more than the value of the maintaining voltage, to which cathode the discharge burns. During the first pulse the discharge burns to the auxiliary electrodes, which then are at −30 v.

At the second pulse Y of Fig. 7 it is assumed that the discharge changes over to the marker cathode $K_0$, which is first at the negative voltage $V_y$. The anode voltage will therefore initially drop to the value of $V_m-V_y$ and owing to the presence of the capacitor $C_4$ it will increase only gradually.

The pulse occurring during the transition to the marker cathode is therefore much higher than the pulse occurring at the transition to a different cathode.

The pulse occurring at the anode during a transition between two normal cathodes is only 30 v., in spite of the fact that the negative pulse at the auxiliary electrodes is 90 v. This is due to the provision of the resistors $R_7$ and $R_8$, which produce a voltage drop immediately after the ignition of the discharge to the auxiliary electrodes, while, moreover, the auxiliary electrodes are previously at +40 v. Owing to the resistors $R_7$ and $R_8$ the difference between the anode pulses at a transition to normal cathodes and at a transition to a marker cathode is higher than would be the case if these resistors were not provided.

The circuit arrangement shown in Fig. 6 comprises a diode D, which is connected in a manner such that the voltage at the marker cathode $K_0$ cannot exceed that at the common zero point E, since otherwise at a transition to the cathode $K_1$ also a higher pulse could occur at the anode.

It is evident from Figs. 7a and 7b that the negative pulses at the auxiliary electrode GA and GB overlap one another to some extent. This is not absolutely necessary; it is sufficient for the pulses to succeed one another directly, but for practical reasons it is more efficient to provide a certain extent of overlapping in order to avoid interference.

The Figs. 8 and 9, which show variants of the arrangements shown in Figs. 1 and 2, illustrate a tube in which the marker cathode $K_0$ is displaced as a whole to the outside. The references are identical to those of Figs. 1 and 2.

Figure 10:
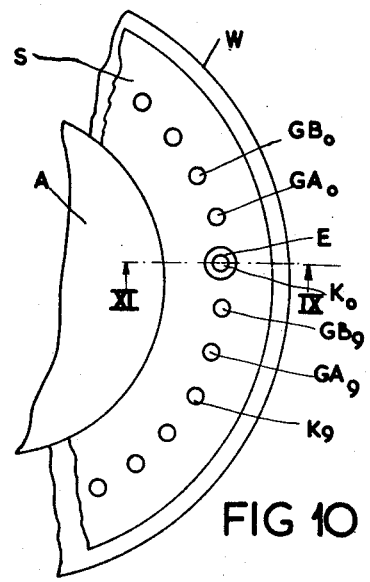
Figure 11:
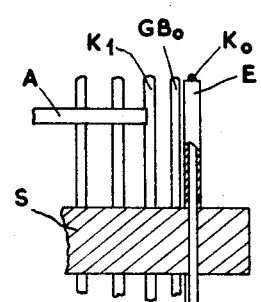

The Figs. 10 and 11 show in the manner of Figs. 1 and 2 a tube in which the higher break-down voltage to the marker cathode $K_0$ is obtained by surrounding this cathode over the larger part of its length by a tubule E of glass or ceramic material. In the foregoing these arrangements are described with only one marker cathode in each tube. It will be obvious that, in principle, more than one marker cathode may be employed in one tube.

What is claimed:

1. A glow discharge stepping tube comprising an anode, a plurality of wire-shaped main cathodes symmetrically disposed about and surrounding said anode, a plurality of wire-shaped auxiliary cathodes spaced from and between adjacent main cathodes to effect a transfer of the discharge from one cathode to an adjoining cathode, and a wire-shaped marker cathode having a position relative to said main cathodes and said anode at which the ignition potential between the marker cathode and the anode exceeds that between the anode and the other main cathodes.

2. A glow-discharge stepping tube as claimed in claim 1, in which a major portion of the surface of the marker cathode is covered with a resistance layer.

3. A glow-discharge stepping tube as claimed in claim 1, in which the marker cathode has an emissive potential differing from that of the main cathodes and auxiliary electrodes.

4. A circuit arrangement comprising a glow-discharge counting tube, having a centrally arranged anode and a plurality of main cathodes which are arranged symmetrically around the anode, as claimed in claim 1, and a current-limiting resistor for the tube is included in the anode lead, the output-lead for the pulses to be reproduced being connected directly to the anode lead.

5. An arrangement as claimed in claim 4, in which even-numbered cathodes and odd-numbered cathodes are connected separately via a parallel combination of a resistor and a capacitor to a negative voltage relative to a common terminal, the marker cathode also being connected via a parallel combination of a resistor and a capacitor to a higher negative voltage and which the auxiliary electrodes are arranged in rows located between the main cathodes, the first row, viewed in the direction of the discharge, being connected to the common terminal and the second row of auxiliary electrodes is also connected to the said terminal through a relatively high resistance, the second row of auxiliary electrodes being also connected via a capacitor to an input terminal for the control-pulse, the resistors in the cathode leads having a value at which the discharge burning to a main cathode changes over for the major part to the first adjacent auxiliary electrode and the resistor in the lead to the second auxiliary electrode has a value at which when a discharge burns to a main cathode and an associated first auxiliary electrode, the secondary auxiliary electrode assumes a voltage which approaches that of the anode.

6. An arrangement as claimed in claim 4, in which the tube is governed by two input pulses, which are applied in succession to the first and to the second row of auxiliary electrodes, the even-numbered and the odd-numbered cathodes being connected directly to the common terminal and the marker cathode being connected via a parallel combination of a resistor and a capacitor to a negative potential relative to the common terminal, the lead to the marker cathode including a connection to a rectifier connected to the common terminal in a manner such that the marker cathode can never assume a positive voltage relative to the common terminal, the two rows of auxiliary electrodes being connected via resistors to a positive bias voltage which is sufficient to transfer the discharge, after the termination of the negative pulses, while between the capacitors via which these pulses are supplied and the auxiliary electrodes provision is made of resistors to restrict the negative voltage pulses at the anode, when negative voltage pulses at the auxiliary electrodes cause the discharge to change over thereto.

References Cited in the file of this patent

UNITED STATES PATENTS

| | | |
|---|---|---|
| 2,651,004 | Acton | Sept. 1, 1953 |
| 2,677,074 | Reuter | Apr. 27, 1954 |
| 2,679,978 | Kandiah | June 1, 1954 |
| 2,693,552 | Steinberg | Nov. 2, 1954 |
| 2,739,266 | Burnett | Mar. 20, 1956 |
| 2,787,729 | Sternbeck et al. | Apr. 2, 1957 |
| 2,816,250 | Acton | Dec. 10, 1957 |

UNITED STATES PATENT OFFICE

CERTIFICATE OF CORRECTION

Patent No. 2,905,860                                       September 22, 1959

Gerald Offley Crowther et al.

It is hereby certified that error appears in the printed specification of the above numbered patent requiring correction and that the said Letters Patent should read as corrected below.

Column 2, line 62, for "sectionl" read -- sectional --; column 6, line 59, for "secondary" read -- second --.

Signed and sealed this 8th day of March 1960.

(SEAL)
Attest:

KARL H. AXLINE
Attesting Officer

ROBERT C. WATSON
Commissioner of Patents